US012726857B2

(12) United States Patent
Chakka et al.

(10) Patent No.: US 12,726,857 B2
(45) Date of Patent: Sep. 1, 2026

(54) BANDWIDTH PART MISMATCH DETECTION AND MITIGATION

(71) Applicant: Apple Inc., Cupertino, CA (US)

(72) Inventors: Murali Mohan Chakka, Los Gatos, CA (US); Baohua Zheng, San Diego, CA (US); Prashant H. Vashi, San Jose, CA (US)

(73) Assignee: Apple Inc., Cupertino, CA (US)

(*) Notice: Subject to any disclaimer, the term of this patent is extended or adjusted under 35 U.S.C. 154(b) by 295 days.

(21) Appl. No.: 18/434,678

(22) Filed: Feb. 6, 2024

(65) Prior Publication Data

US 2024/0430749 A1 Dec. 26, 2024

Related U.S. Application Data

(60) Provisional application No. 63/510,098, filed on Jun. 23, 2023.

(51) Int. Cl.
*H04W 72/0453* (2023.01)
*H04W 24/02* (2009.01)
(Continued)

(52) U.S. Cl.
CPC ........... *H04W 28/20* (2013.01); *H04W 24/02* (2013.01); *H04W 28/0983* (2020.05)

(58) Field of Classification Search
CPC .... H04L 1/1851; H04L 5/0098; H04W 28/20; H04W 72/0453; H04W 72/0446; H04W 72/232; H04W 28/0983
(Continued)

(56) References Cited

U.S. PATENT DOCUMENTS

2021/0251033 A1* 8/2021 Kanamarlapudi ........................... H04W 72/1263
2021/0376990 A1 12/2021 Cirik et al.
(Continued)

FOREIGN PATENT DOCUMENTS

WO 2022021365 A1 2/2022

OTHER PUBLICATIONS

International Patent Application No. PCT/US2024/032643—International Search Report and Written Opinion dated Sep. 16, 2024.

*Primary Examiner* — John Pezzlo
(74) *Attorney, Agent, or Firm* — DICKINSON WRIGHT RLLP

(57) ABSTRACT

The described embodiments regard detecting a bandwidth part (BWP) mismatch between a wireless device and a cellular wireless network base station and performing mitigation to correct for the BWP mismatch. The wireless device can detect a BWP mismatch, based on content of a downlink control information (DCI) message indicating to switch BWP configurations, which is inconsistent with a scheduled downlink resource or granted uplink resource indicated in the DCI message occurring before completion of a BWP switching delay time period. The wireless device can monitor for DCI messages, after switching BWP configurations, in accordance with a previous BWP configuration for a monitoring time period to confirm use of the new BWP configuration or to detect a BWP mismatch. Responsive to detecting a BWP mismatch, the wireless device switches back to the previous BWP configuration without waiting to complete the BWP switching delay time period for switching BWP configurations.

20 Claims, 9 Drawing Sheets

(51) Int. Cl.
*H04W 28/08* (2023.01)
*H04W 28/20* (2009.01)

(58) Field of Classification Search
USPC .................................. 370/252, 329, 430, 442
See application file for complete search history.

(56) References Cited

U.S. PATENT DOCUMENTS

2023/0069021 A1* 3/2023 Zhou .................. H04B 7/06964
2023/0105766 A1* 4/2023 Wang .................... H04L 5/0055 370/329
2023/0354285 A1* 11/2023 Li .......................... H04W 72/23
2024/0098720 A1* 3/2024 Pu ........................ H04W 72/232
2024/0389107 A1* 11/2024 Xie ........................ H04W 72/40

* cited by examiner

300

BWP ID-1: Monitor For PDCCH In Every Slot (DL/Special Only)

BWP ID-1 Bandwidth 302

| Slot Type | D | D | D | S | U | U | D | D | D | D | D | D | D | S | U | U | D | D | D | D |
|---|---|---|---|---|---|---|---|---|---|---|---|---|---|---|---|---|---|---|---|---|
| Slot # | 0 | 1 | 2 | 3 | 4 | 5 | 6 | 7 | 8 | 9 | 10 | 11 | 12 | 13 | 14 | 15 | 16 | 17 | 18 | 19 |
| Monitoring | M | M | M | M | | | M | M | M | M | M | M | M | M | | | M | M | M | M |
| Frame # | XYZ | | | | | | | | | | | | | | | | | | | |

Time

320

BWP ID-2: Monitor For PDCCH Every Fourth Slot Starting At Offset Of Two Slots From Frame Start (DL/Special Only)

BWP ID-2 Bandwidth 322

| Slot Type | D | D | D | S | U | U | D | D | D | D | D | D | D | S | U | U | D | D | D | D |
|---|---|---|---|---|---|---|---|---|---|---|---|---|---|---|---|---|---|---|---|---|
| Slot # | 0 | 1 | 2 | 3 | 4 | 5 | 6 | 7 | 8 | 9 | 10 | 11 | 12 | 13 | 14 | 15 | 16 | 17 | 18 | 19 |
| Monitoring | | | M | | | | M | | | | M | | | | | | | | M | |
| Frame # | XYZ | | | | | | | | | | | | | | | | | | | |

Time

340

BWP ID-3 Bandwidth 342

BWP ID-3: Monitor For PDCCH In Every Slot (DL/Special Only)

BWP ID-3 CORESET Search Space May Use Same Or Different Time/Frequency Resources Than On BWP ID-1

| Slot Type | D | D | D | S | U | U | D | D | D | D | D | D | D | S | U | U | D | D | D | D |
|---|---|---|---|---|---|---|---|---|---|---|---|---|---|---|---|---|---|---|---|---|
| Slot # | 0 | 1 | 2 | 3 | 4 | 5 | 6 | 7 | 8 | 9 | 10 | 11 | 12 | 13 | 14 | 15 | 16 | 17 | 18 | 19 |
| Frame # | XYZ | | | | | | | | | | | | | | | | | | | |

M M M M M M M M M M M M M M M M

Time

Bandwidth Part Mismatch Error

Wireless Device 102

5G NR gNB 104

RRC Setup Request 402

RRC Setup 404

RRC Setup Complete 406

Configure BWP ID-1 and ID-2

RRC Reconfiguration 408

RRC Reconfiguration Complete 410

BWP ID-1 Active 412

Decode "DCI" Switch to BWP ID-2 416

Transition Delay 426

BWP ID Mismatch Between Wireless Device & gNB

BWP ID-2 Active 418

BWP ID-1 Active 414

Scheduling Request (SR) 420

Wireless Device Decodes UL Grant To Have Faulty Switch to BWP ID-1 Indication, Discards UL Grant, and Remains in BWP-2 Active State 424

UL Grant (Sent Using BWP ID-1) 422

UL Data Stalled by BWP ID Mismatch

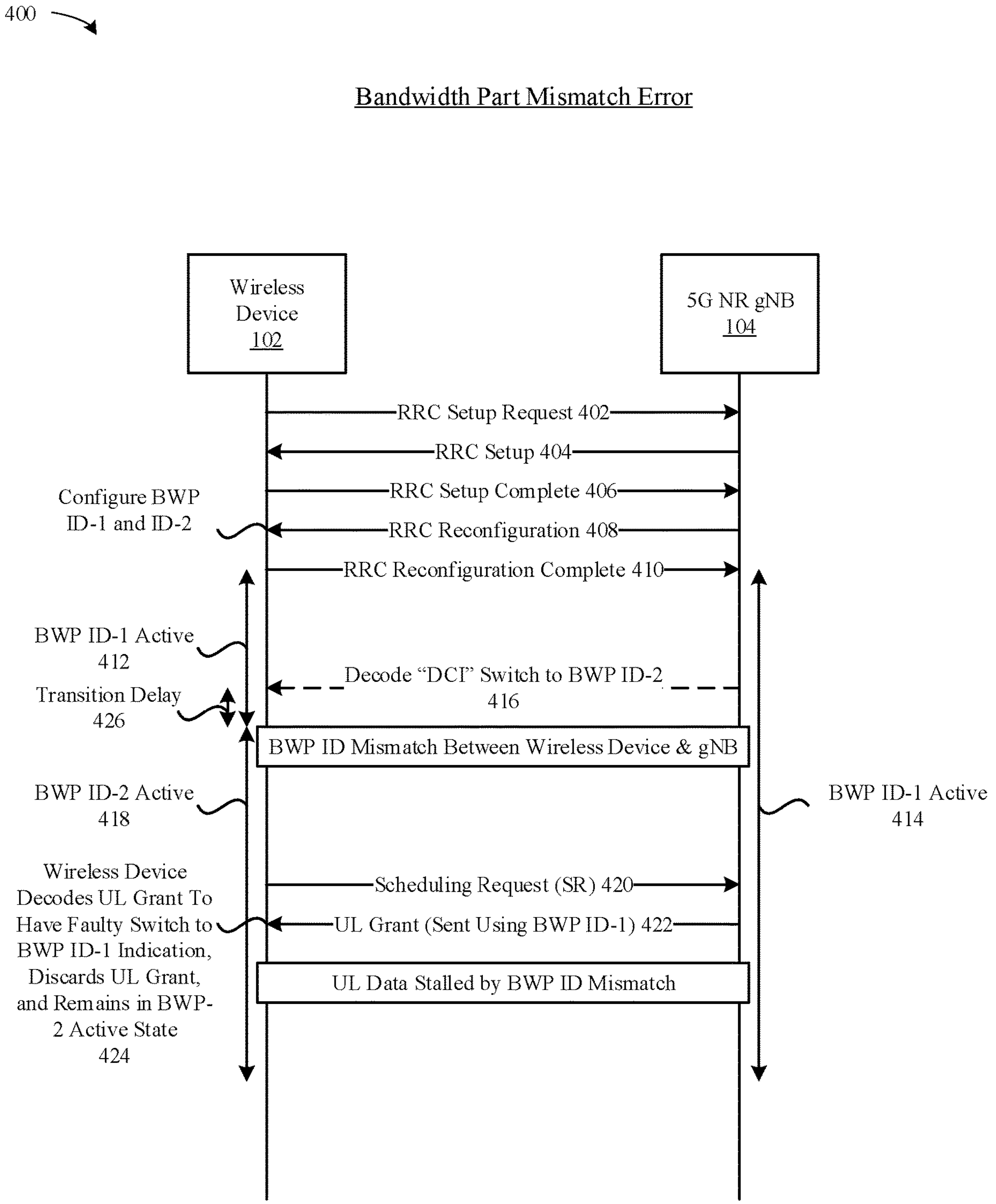

*FIG. 4A*

BANDWIDTH PART MISMATCH DETECTION AND MITIGATION

CROSS-REFERENCE TO RELATED APPLICATIONS

The present application claims the benefit of U.S. Provisional Application No. 63/510,098, entitled "BANDWIDTH PART MISMATCH DETECTION AND MITIGATION," filed Jun. 23, 2023, the content of which is incorporated by reference herein in its entirety for all purposes.

FIELD

The described embodiments relate to wireless communications, including system, methods, and apparatus for detecting a bandwidth part (BWP) mismatch between a wireless device and a cellular wireless network base station and performing mitigation to correct for the BWP mismatch.

BACKGROUND

Newer generation, fifth generation (5G), cellular wireless networks that implement one or more 3$^{rd}$ Generation Partnership Project (3GPP) standards are rapidly being developed and deployed by mobile network operators (MNOs) worldwide. In addition, sixth generation (6G) standards are in active development. The newer cellular wireless networks provide a range of packet-based services, with 5G (and 6G) technology providing increased data throughput and lower latency connections that promise enhanced mobile broadband services for 5G-capable (and 6G-capable) wireless devices. Access to cellular services provided by an MNO can require use to cellular credentials and/or secure processing provided by a secure element (SE), such as a universal integrated circuit card (UICC) or an embedded UICC (cUICC) included in the wireless device.

Wireless devices can be configured to use removable UICCs, that include at least a microprocessor and a read-only memory (ROM), where the ROM is configured to store an MNO profile, also referred to as subscriber identity module (SIM) or SIM profile, which the wireless device can use to register and interact with a cellular wireless network of an MNO to obtain access wireless services. The SIM profile hosts subscriber data, such as a digital identity and one or more cryptographic keys, to allow the wireless device to communicate with a cellular wireless network. Typically, a UICC takes the form of a small removable card, commonly referred to as a SIM card or physical SIM (pSIM) card, which can be inserted into a UICC-receiving bay of a mobile wireless device. In more recent implementations, UICCs are being embedded directly into system boards of wireless devices as eUICCs, which can provide advantages over traditional, removable UICCs. The eUICCs can include a rewritable memory that can facilitate installation, modification, and/or deletion of one or more electronic SIMs (eSIMs) on the eUICC, where the eSIMs can provide for new and/or different services and/or updates for accessing extended features provided by MNOs. An eUICC can store a number of MNO profiles—also referred to herein as eSIMs—and can eliminate the need to include UICC-receiving bays in wireless devices. The use of multiple SIMs and/or eSIMs is expected to offer flexibility for access to multiple services of multiple wireless networks.

A wireless device communicates with a network base station of an access portion of a cellular wireless network using wireless communication protocols and configured based on parameters communicated by the network base station. 5G new radio (NR) connections provide for higher data throughput rates based in part on options for higher bandwidth usage compared with fourth generation (4G) long term evolution (LTE) connections. Continuous use of higher bandwidth connections by a wireless device, however, consumes more power than use of lower bandwidth connections. While carrier bandwidths in 4G LTE are fixed at 20 MHz, carrier bandwidths in 5G NR can range from 20 MHz to 400 MHZ. Release 15 of the 3GPP cellular wireless communication 5G NR standards introduced support for multiple bandwidth parts (BWPs), each BWP configurable for a different bandwidth and/or a different monitoring periodicity, to allow for power savings for transmission and reception by a wireless device. In some circumstances, a wireless device can be configured to use a BWP that differs from the BWP used by a network base station with which the wireless device communicates, resulting in a BWP mismatch. There exists a need to detect BWP mismatch occurrences and perform mitigation actions to correct for the BWP mismatch.

SUMMARY

The described embodiments relate to wireless communications, including system, methods, and apparatus for detecting a bandwidth part (BWP) mismatch between a wireless device and a cellular wireless network base station and performing mitigation to correct for the BWP mismatch. A network base station of a cellular wireless network configures BWP parameters for communication with a wireless device as part of a radio resource control (RRC) procedure. The wireless device can be configured to use multiple BWPs, with only one BWP being active at any given time. The network base station can configure the wireless device to use a particular BWP via a downlink control information (DCI) message that includes a BWP indicator value, such as in a downlink (DL) scheduling grant that allocates resources for DL communication to the wireless device or in an uplink (UL) grant responsive to a resource request from the wireless device for UL communication. While configured to use a first BWP, the wireless device searches for and decodes DCI messages communicated via a physical downlink control channel (PDCCH) in accordance with the first BWP configuration. When a DCI message includes a BWP indicator value indicating a second BWP configuration for communication different from the first, currently used, BWP configuration, and additional parameters for communication to/from the wireless device included in the DCI message are consistent with switching the BWP configuration after an applicable BWP switching delay time period, the wireless device transitions from using the first BWP configuration to the second BWP configuration after the applicable BWP switching delay time period. In some circumstances, a wireless device can decode an errant DCI message to switch BWP configurations, where the wireless network did not send a proper DCI message to switch BWP configurations. The wireless device can unknowingly switch BWP configurations to use a BWP configuration different from the BWP configuration, which may continue to be used by the network base station, resulting in a BWP mismatch between the wireless device and the network base station. The wireless device can later detect the BWP mismatch and perform actions to mitigate the BWP mismatch. When the wireless device decodes a DCI message that includes a BWP indicator value indicating a second BWP configuration for communication different from the first, currently used, BWP configuration, and additional parameters for communication to/from the wireless device included in the DCI message are not consistent with switching the BWP configuration after an applicable BWP switching delay time period, the wireless device can determine a BWP mismatch exists between the wireless device and the network base station. Responsive to detecting the BWP mismatch, the wireless device can switch back to the second BWP configuration that is in use by the network base station without waiting to complete a predetermined BWP switching delay time period for switching BWP configurations. Switching back to a previous BWP configuration can occur substantially immediately or as quickly as feasible for the wireless device to correct for the BWP mismatch. In some embodiments, the wireless device monitors for DCI messages in accordance with a previous, most recently used BWP configuration for a predetermined period of time after switching to a currently used BWP configuration to allow the wireless device to confirm use of the currently used BWP configuration or to detect a BWP mismatch. In some embodiments, two of the BWP configurations for the wireless device have different slot monitoring requirements, e.g., the first BWP configuration can require monitoring all applicable slots for DCI messages, while the second BWP configuration can require monitoring every nth slot (if applicable) for DCI messages. In a time division duplex (TDD) configuration, only DL slots and special (mixed DL/UL) slots are applicable for monitoring. In some embodiments, the wireless device monitors applicable slots for DCI messages at whichever applicable rate is more frequent between a currently used BWP configuration and a previous, most recently used BWP configuration for a predetermined time period after switching BWP configurations. In some embodiments, the wireless device monitors all applicable time slots for DCI messages for a predetermined time period after switching BWP configurations, independent of the currently used or most previously used BWP configuration. In some embodiments, the wireless device detects a BWP mismatch based on a DCI message including i) a BWP switching indication and either ii) an indication of a scheduled DL resource for DL communication from the base station to the wireless device or iii) an indication of an allocated UL resource granted in response to a service request, where the scheduled DL resource of the allocated UL resource occurs during a time period after receipt of the DCI message and before expiration of an applicable BWP switching delay time period. In some embodiments, the wireless device detects a BWP mismatch based on parameters for DL or UL communication in a DCI message that are inconsistent with a BWP switching delay time period. In some embodiments, responsive to detecting a BWP mismatch based on content of a DCI message, the wireless device switches to use the BWP configuration indicated in the DCI message without waiting for a BWP switching time delay, e.g., substantially immediately or as quickly as feasible for the wireless device after detecting the BWP mismatch.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

FIG. 4A illustrates a flow diagram of an example of a BWP mismatch error occurrence between a wireless device and a 5G new radio (NR) gNodeB (gNB) base station, according to some embodiments.

DETAILED DESCRIPTION

Figure 1:
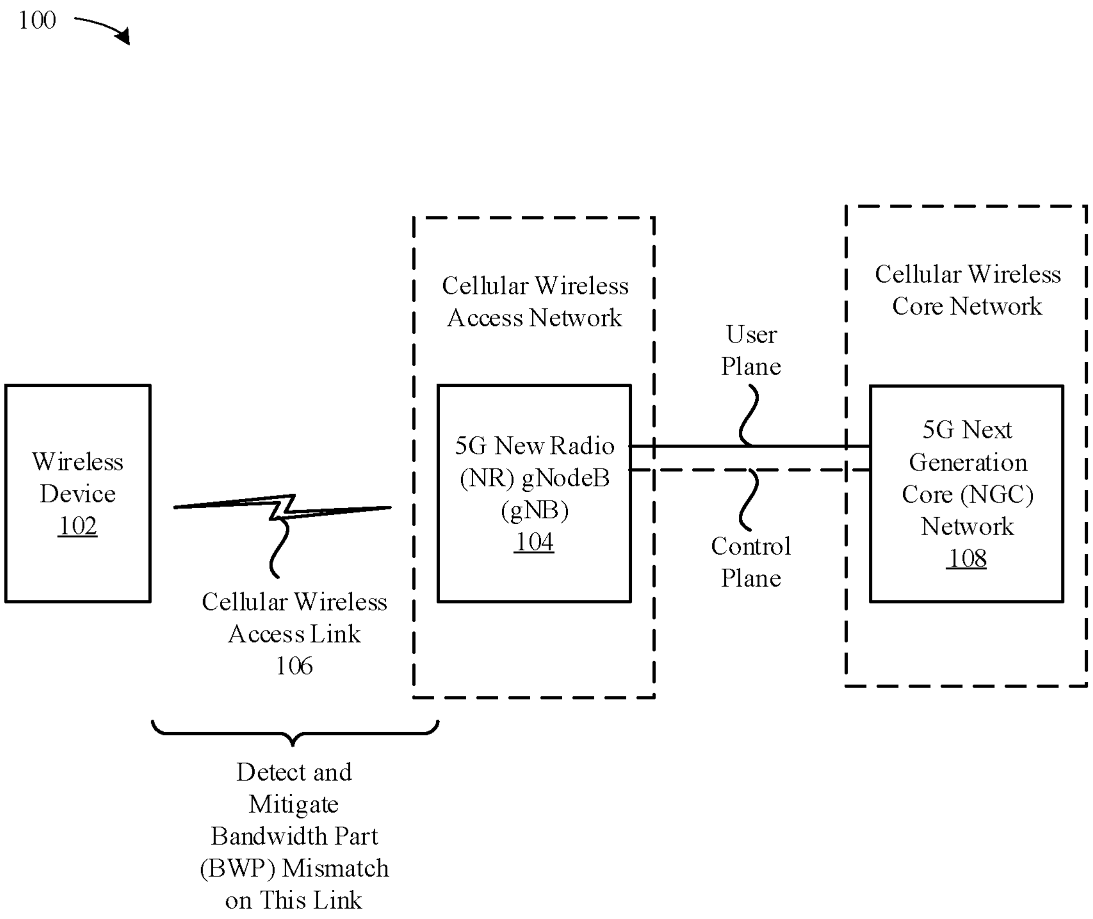
FIG. 1 illustrates a block diagram of different components of an exemplary system configured to bandwidth part (BWP) mismatch detection and mitigation for a wireless device, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

The described embodiments relate to wireless communications, including system, methods, and apparatus for detecting a bandwidth part (BWP) mismatch between a wireless device and a cellular wireless network base station and performing mitigation to correct for the BWP mismatch. A wireless device communicates with a network base station of an access portion of a cellular wireless network using wireless communication protocols and configured based on parameters communicated by the network base station. 5G new radio (NR) connections provide for higher data throughput rates based in part on options for higher bandwidth usage compared with fourth generation (4G) long term evolution (LTE) connections. Continuous use of higher bandwidth connections by a wireless device, however, consumes more power than use of lower bandwidth connections. While carrier bandwidths in 4G LTE are fixed at 20 MHZ, carrier bandwidths in 5G NR can range from 20 MHz to 100 MHz. Release 15 of the 3GPP cellular wireless communication 5G NR standards introduced support for multiple bandwidth parts (BWPs), each BWP configurable for different bandwidth and/or monitoring periodicity, to allow for power savings for transmission and reception by a wireless device.

A network base station of a cellular wireless network configures BWP parameters for communication with a wireless device as part of a radio resource control (RRC) procedure. The wireless device can be configured to use multiple BWPs, with only one BWP being active at any given time. Downlink (DL) and uplink (UL) communication can each have their own BWP configuration. A BWP configuration can specify a bandwidth and a portion of a radio frequency (RF) spectrum to be used for communication between the wireless device and the network base station. The BWP configuration can also specify a slot monitoring periodicity to be used by the wireless device. In a representative first BWP configuration associated with a BWP indicator value of "one", BWP-ID1, a wireless device uses a maximum bandwidth of an RF carrier and monitors every applicable slot for physical layer downlink control channel (PDCCH) communication, while in a representative second BWP configuration associated with a BWP indicator value of "two", BWP-ID2, the wireless device is configured to use the same maximum bandwidth of the RF carrier but monitor for PDCCH communication every nth slot, SLn, thereby allowing the wireless device to conserve power while in an active state. In a representative third BWP configuration associated with a BWP indicator value of "three", BWP-ID3, the wireless device is configured to use a narrower bandwidth of the RF carrier and monitor every applicable slot for PDCCH communication, where the use of the narrower RF bandwidth results in a power savings for the wireless device. In some embodiments, the time-frequency control resource set (CORESET) and search space for PDCCH communication within a BWP can be the same when the wireless device is configured with BWP-ID1 or BWP-ID2. In some embodiments, the time-frequency CORESET and search spaces for BWP-ID1 and BWP-ID3 for the wireless device can be the same, can overlap at least in part, or can be distinct.

The network base station can configure the wireless device to use a particular BWP via a downlink control information (DCI) message that includes a BWP indicator value, such as in a DL scheduling grant that allocates resources for DL communication to the wireless device or in an UL grant responsive to a resource request from the wireless device for UL communication. The network base station can switch between different BWP configurations for the wireless device based on data throughput thresholds, e.g., selecting a BWP configuration that allows for higher data throughput, but consumes more power for the wireless device, when pending data or active data communication warrants, and using a BWP configuration that conserves wireless device power, but limits data throughput, when there are low or no user data requirements for the wireless device. In some embodiments, a default BWP configuration, BWP-ID1, provides for high data throughput for the wireless device, while a second BWP configuration, BWP-ID2, or a third BWP configuration, BWP-ID3, provides for power savings for the wireless device. In some cases, BWP-ID2 provides for power savings based on reduced PDCCH monitoring requirements, while BWP-ID3 provides for power savings based on reduced bandwidth use. While the wireless device is configured with the higher data throughput BWP-ID1 configuration, upon detecting a period of user data inactivity (or user data activity satisfying a low throughput threshold), the network base station triggers the wireless device to switch to the lower data throughput BWP-ID2 configuration to conserve power. While the wireless device is configured with the lower data throughput BWP-ID2 or BWP-ID3, upon detecting a period of intense user data activity (e.g., user data activity satisfying a high throughput threshold), the network base station triggers the wireless device to switch to the higher data throughput BWP-ID1 configuration. There are multiple mechanisms by which a network base station can configure a wireless device to switch BWP configurations including via DCI messages or via radio resource control (RRC) reconfiguration messaging. Presently, cellular wireless networks use DCI messaging to cause a wireless device to switch BWP configurations.

While configured to use a first BWP configuration, the wireless device searches for and decodes DCI messages communicated via a PDCCH in accordance with the first BWP configuration. Each BWP configuration can have its own CORESET and search space for PDCCH communication. When the DCI message includes a BWP indicator value indicating a second BWP configuration for communication that differs from the first, currently used, BWP configuration, and additional parameters for communication to/from the wireless device included in the DCI message are consistent with switching the BWP configuration after an applicable BWP switching delay time period, the wireless device can transition from using the first BWP configuration to the second BWP configuration after the applicable BWP switching delay time period.

In some circumstances, a wireless device can decode an errant DCI message to switch BWP configurations, where the wireless network did not send a proper DCI message to switch BWP configurations. The wireless device can unknowingly switch BWP configurations to use a BWP configuration different from the BWP configuration continuing to be used by the network base station, resulting in a BWP mismatch between the wireless device and the network base station. The wireless device can later detect the BWP mismatch and perform actions to mitigate the BWP mismatch. When a DCI message decoded by the wireless device includes a BWP indicator value indicating a second BWP configuration for communication different from the first, currently used, BWP configuration, and additional parameters for communication to/from the wireless device included in the DCI message are not consistent with switching the BWP configuration after an applicable BWP switching delay time period, the wireless device can determine a BWP mismatch exists between the wireless device and the network base station. Responsive to detecting the BWP mismatch, the wireless device can conclude that the wireless device is using the incorrect BWP configuration and can switch to using the second BWP configuration indicated in the DCI message without waiting to complete an applicable, predetermined BWP switching. Switching back to the previous BWP configuration can occur substantially immediately or as quickly as feasible for the wireless device.

In some embodiments, the wireless device monitors for DCI messages in accordance with a previous, most recently used BWP configuration for a predetermined period of time after switching to a currently used BWP configuration. In some embodiments, two different BWP configurations for the wireless device have different slot monitoring requirements, e.g., the first BWP configuration can require monitoring all applicable slots for DCI messages, while the second BWP configuration can require monitoring every nth slot (if applicable) for DCI messages. In a time division duplex (TDD) configuration, only DL slots and special (mixed DL/UL) slots are applicable for monitoring. In some embodiments, the wireless device monitors applicable slots for DCI messages at whichever applicable rate is more frequent between a currently used BWP configuration and a previous, most recently used BWP configuration for a predetermined monitoring time period after switching BWP configurations. In some embodiments, the wireless device monitors all applicable slots for DCI messages for a predetermined monitoring time period after switching BWP configurations, independent of the currently used or most previously used BWP configuration. In some embodiments, the wireless device monitors applicable time-frequency resources for PDCCH communication in accordance with a currently used BWP configuration and in accordance with a previously used BWP configuration, e.g., when each BWP configuration uses different time-frequency resources for PDCCH communication, for a predetermined monitoring time period after switching BWP configurations to decrease a likelihood of missing a DCI message from the network base station to the wireless device.

In some embodiments, the wireless device detects a BWP mismatch based on a decoded DCI message including i) a BWP switching indication and either ii) an indication of a scheduled DL resource for DL communication from the base station to the wireless device or iii) an indication of an allocated UL resource granted in response to a service request, where the scheduled DL resource of the allocated UL resource occurs during a time period after receipt of the DCI message and before expiration of an applicable BWP switching delay timer. As the DCI message indicates the wireless device should receive a DL communication or transmit an UL communication using a different BWP configuration than currently used and before switching of the BWP configuration would normally occur, e.g., the DL communication or UL communication occurs during the BWP switching delay time period, the wireless device determines a BWP mismatch has occurred. In some embodiments, the wireless device detects a BWP mismatch between the wireless device and the network base station based on parameters for DL communication or parameters for UL communication in a DCI message that are inconsistent with a BWP switching delay time period. In some embodiments, responsive to detecting a BWP mismatch based on content of a DCI message, the wireless device switches to use the BWP configuration indicated in the DCI message without waiting to complete a BWP switching delay time period. Switching back to the previous BWP configuration can occur substantially immediately or as quickly as feasible for the wireless device.

These and other embodiments are discussed below with reference to FIGS. 1 through 7; however, those skilled in the art will readily appreciate that the detailed description given herein with respect to these figures is for explanatory purposes only and should not be construed as limiting.

FIG. 1 illustrates a block diagram 100 of different components of a cellular wireless communication system that includes i) a wireless device 102, which can also be referred to as a mobile wireless device, a cellular wireless device, a wireless communication device, a mobile device, a user equipment (UE), a device, and the like, ii) a 5G NR gNodeB (gNB) 104, which is a network entity of a cellular wireless access network and can also be referred to herein as a base station or network base station, and iii) a 5G next generation core (NGC) network 108. The wireless device 102 can represent a mobile computing device (e.g., an iPhone®, an iPad®, or an Apple Watch® by Apple®). Applications resident on the wireless device 102 can advantageously access services of a cellular wireless network using 5G NR connections via the 5G NR gNB 104. Communication between the wireless device 102 and the 5G NR gNB 104 over a cellular wireless access link 106 can be configured by the 5G NR gNB 104 to use a set of bandwidth part (BWP) configurations that each specify a range of radio frequencies of a carrier to be used, along with additional configuration parameters. Release 15 of the 3GPP cellular wireless communication 5G NR standards introduced support for multiple bandwidth parts (BWPs), each BWP configurable for a different bandwidth and/or a different monitoring periodicity, to allow for power savings for transmission and reception by the wireless device 102. In some circumstances, the wireless device 102 can be configured to use a BWP that differs from the BWP used by the 5G NR gNB 104 with which the wireless device 102 communicates, resulting in a BWP mismatch. As described herein, the wireless device 102 can detect and perform actions to mitigate a BWP mismatch occurrence.

Figure 2:
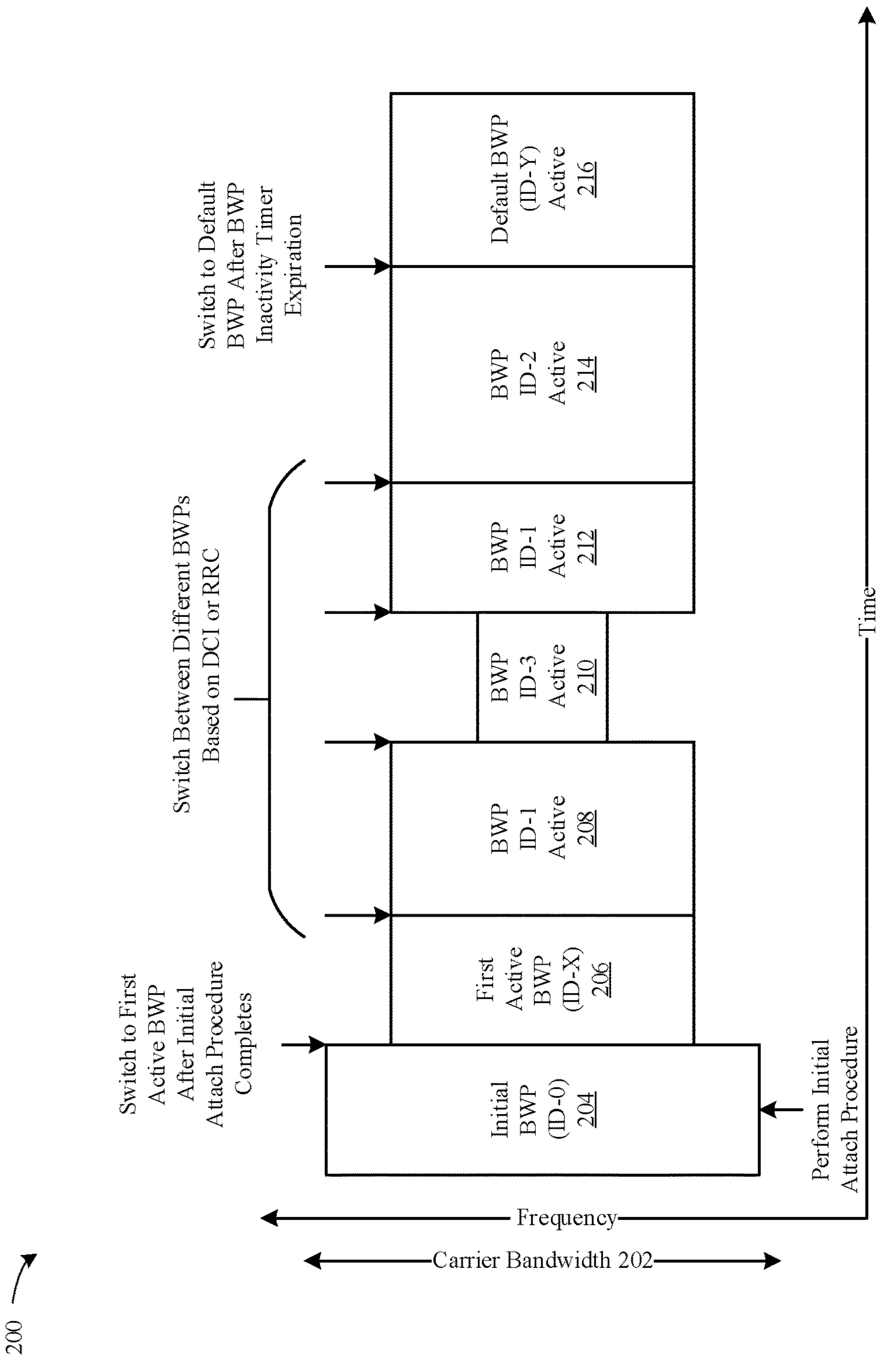
FIG. 2 illustrates a block diagram of exemplary different types of BWPs that can be configured for a wireless device, according to some embodiments.

FIG. 2 illustrates a block diagram 200 of an exemplary set of different bandwidth part (BWP) configurations that can be used by a wireless device 102. Each BWP can span a portion of a range of radio frequencies supported by a radio frequency (RF) carrier that spans a carrier bandwidth 202. A BWP can be defined as a set of contiguous physical time-frequency resource blocks on a carrier and characterized by additional parameters, such as a subcarrier spacing and cyclic prefix value. A set of BWP configurations for a wireless device 102 can be communicated to the wireless device 102 by a cellular wireless network base station, e.g., 5G NR gNB 104. The wireless device 102 can use a BWP that spans a wider bandwidth, e.g., to a full bandwidth of the underlying RF carrier, when communicating at higher data throughput rates, and can use a BWP that spans a narrower bandwidth when monitoring control channel communication and/or communicating at lower data throughput rates. During a time period 204 of an initial attach procedure to establish an association and connection between the wireless device 102 and the cellular wireless network base station, the wireless device 102 can use an initial BWP having an identifier value of zero, referred to as BWP ID-0, the initial BWP spanning a full bandwidth of an RF carrier. After the initial attach procedure completes, the wireless device 102 switches to using during a second time period 206 a first active BWP, indicated here as having an unspecified identifier value 'X', as one of multiple BWP configurations included in a set of BWP configurations for the wireless device 102 can be indicated as the first active BWP by the cellular wireless network base station. The first active BWP ID-X can be determined by the wireless device 102 based on information broadcast by the network base station to the wireless device 102 on a physical broadcast channel (PBCH). In accordance with 3GPP 5G NR cellular wireless standards, a wireless device 102 can be configured by the network base station with up to four BWPs for communication in the downlink (DL) direction from the network base station to the wireless device 102 and up to four BWPs for communication in the uplink (UL) direction from the wireless device 102 to the network base station. The set of BWPs for the wireless device 102 and control resource sets (CORESETs) for each BWP are communicated to the wireless device 102 by the network base station on the PBCH. Each BWP can have up to three distinct CORESETs, where a CORESET is a set of time-frequency resources in the BWP on which the wireless device 102 searches for control channels to decode, e.g., to obtain and decode a physical downlink control channel (PDCCH) on which downlink control information (DCI) messages are sent to the wireless device 102 by the network base station.

Only one BWP configuration of the set of BWP configurations is active for the wireless device 102 at any given time. The network base station can communicate which BWP configuration of the set of BWP configurations for the wireless device 102 to use in a particular (DL or UL) direction using downlink control information (DCI) messages on the PDCCH. The 5G NR cellular wireless standards also support communicating which BWP configuration is to be active via a radio resource control (RRC) connection between the wireless device 102 and the network base station. Presently deployed 5G NR cellular wireless networks use DCI messaging to indicate switching between different BWP configurations. As shown in FIG. 2, the network base station can signal to the wireless device to switch among different BWPs, with only one BWP being active during any given time period. For example, the wireless device 102 uses the first active BWP ID-X during time period 206 and switches to BWP ID-1 being active during time period 208, then switches to BWP ID-3 being active during time period 210, returning back to BWP ID-1 being active during time period 212 and then changing to BWP ID-2 being active during time period 214. The wireless device 102 can also be configured with a BWP inactivity timer, which upon expiration can cause the wireless device 102 to switch to a default BWP, e.g., BWP ID-Y, during time period 216, where the value BWP indicator value 'Y' can be one of the configured BWPs.

The wireless device 102 monitors one or more CORESETs of an active BWP for PDCCH communication that include DCI messages that can indicate a change in which BWP is to be active. Exemplary DCI messages that include BWP indicator values include a DCI format 1_1 message used for DL scheduling assignment of time-frequency resources for DL communication and a DCI format 0_1 message used for UL grants of time-frequency resources for UL communication. A DL BWP that is to be active for scheduled DL communication specified in a DCI format 1_1 message sent by the network base station to the wireless device 102 is solely specified by a DL BWP indicator value, which can indicate which DL BWP to use. When the DL BWP indicated is the same as the DL BWP already in use, the wireless device 102 continues to operate with the currently configured DL BWP. When the DL BWP indicated differs from the DL BWP in use, the wireless device 102 is expected to switch to the indicated DL BWP after a BWP switching delay time period, which allows for baseband radio hardware and software to adjust to a new DL BWP. Similarly, an UL BWP that is to be active for granted UL communication specified in a DCI format 0_1 message sent to the wireless device 102 by the network base station is solely specified by an UL BWP indicator value that indicates which UL BWP to use. When the UL BWP indicated is the same as the UL BWP already in use, the wireless device 102 continues to operate with the currently configured UL BWP. When the UL BWP indicated differs from the UL BWP in use, the wireless device 102 is expected to switch to the indicated UL BWP after a BWP switching delay time period. To simplify further discussion, we will use the term BWP switching, which can apply to changing between different DL BWP configurations or to changing between different UL BWP configurations based on BWP indicator values in corresponding DCI messages sent to a wireless device 102 by a network base station.

Figure 3A:
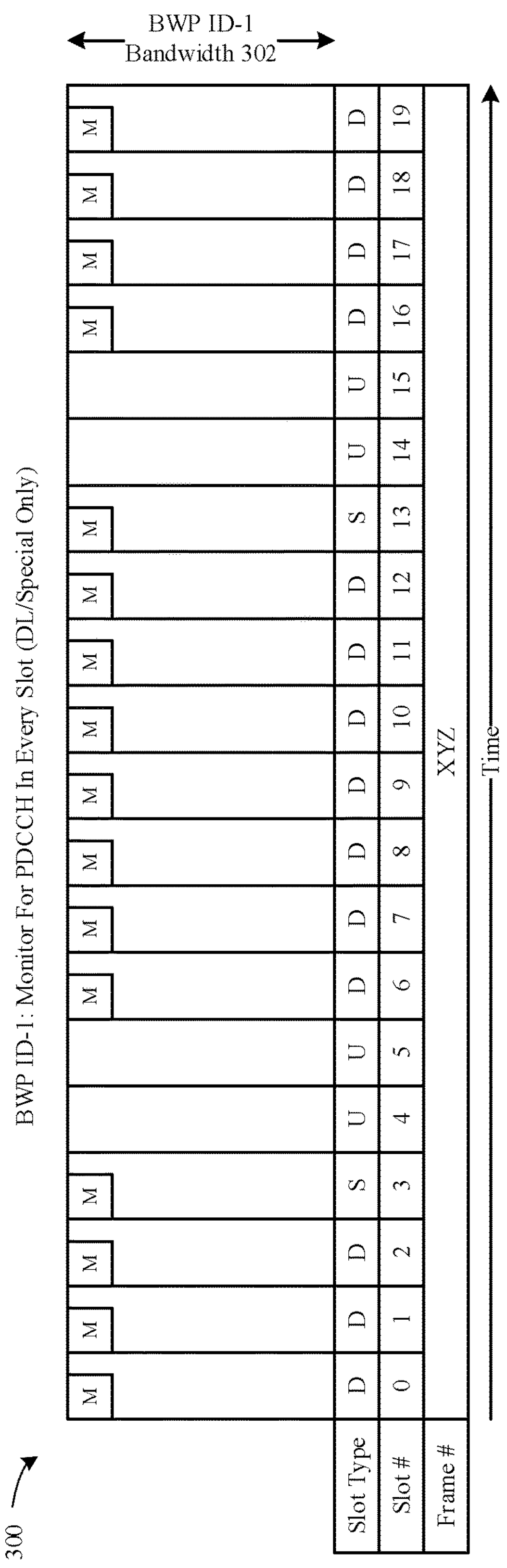
FIGS. 3A, 3B, and 3C illustrate diagrams of examples of slot monitoring for different BWP configurations by a wireless device, according to some embodiments.
Figure 3B:
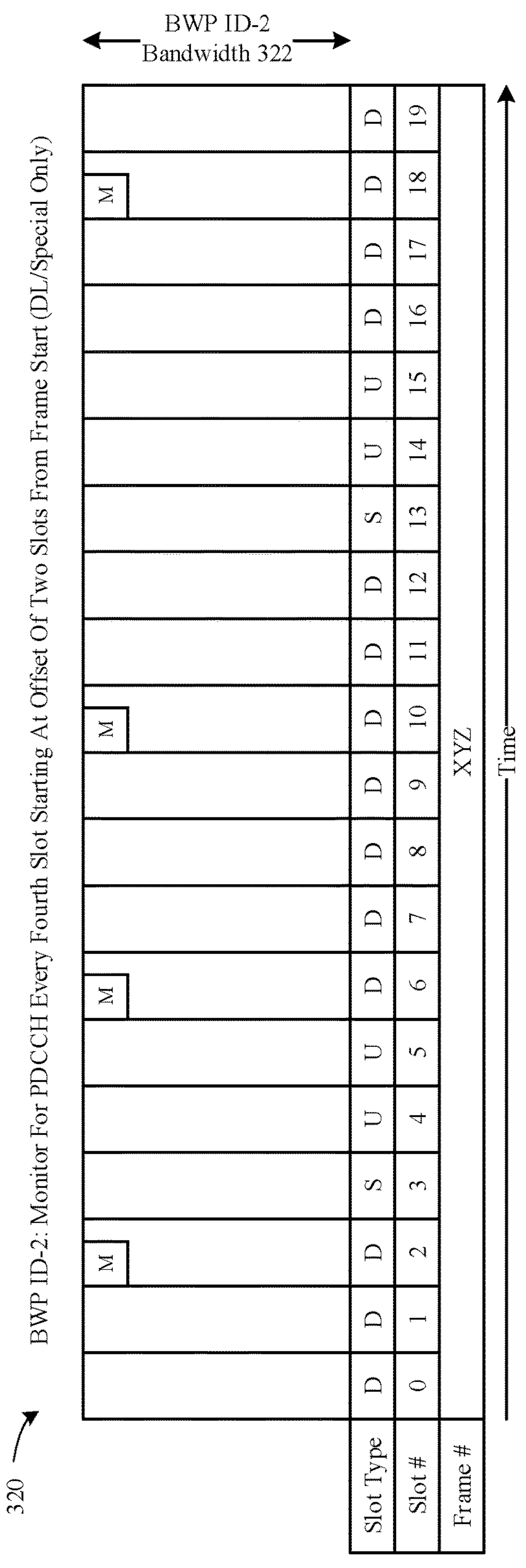
Figure 3C:
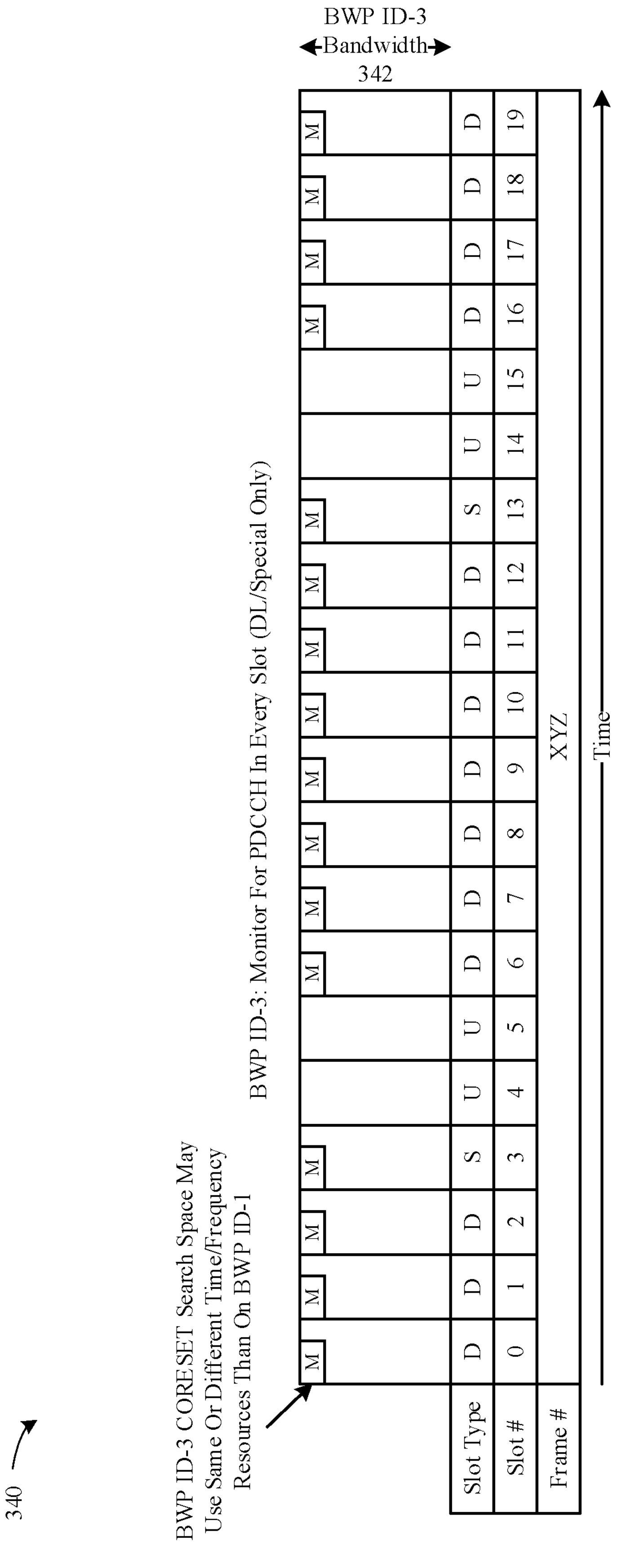

FIGS. 3A, 3B and 3C illustrates diagrams 300, 320, 340 of three different BWP configurations that can be used by a wireless device 102 for time-division duplex (TDD) communication with a network base station. Each successive TDD frame includes 20 numbered slots, some of which are used for DL communication, labeled as slot type 'D', some of which are used for UL communication, labeled as slot type 'U', and some of which are special slots that can include a combination of DL and UL communication, labeled as slot type 'S'. The wireless device 102 can be configured to monitor CORESET search spaces for the PDCCH, which communicates DCI messages to the wireless device 102 from the network base station, during at least some slots of each TDD frame. The monitored CORESET time-frequency resources, on which the wireless device 102 searches for PDCCH communication, are labeled as 'M' regions of particular slots in FIGS. 3A, 3B, and 3C. As illustrated in diagram 300 of FIG. 3A, when a first BWP configuration, BWP ID-1, is active, the wireless device 102 is required to monitor the CORESET search spaces in every applicable slot, which includes DL and special slots only (as UL slots are used for communication in the UL direction to the network base station and will not contain DL PDCCH communication). The first BWP configuration BWP ID-1 spans a first bandwidth 302.

As illustrated in diagram 320 of FIG. 3B, when a second BWP configuration, BWP ID-2, is active, the wireless device 102 is required to monitor the CORESET search spaces in every fourth slot, if applicable based on whether a slot is a DL slot or a special slot, starting at an offset of two slots from the beginning of the TDD frame. Monitoring every nth slot can be referred to as an "SLn" monitoring configuration. Slot 14 is an UL slot and therefore is not monitored. The second BWP configuration BWP ID-2 spans a second bandwidth 322, which in some cases can be the same bandwidth as the first bandwidth 302. The wireless device 102 can conserve power by using the second BWP configuration BWP ID-2 compared to the first BWP configuration BWP ID-1, as fewer slots need to be monitored for DCI messages, and when no data packets are pending (or when relatively lower amounts of data throughput are required), the wireless device 102 can enter a reduced power state during at least some of the intervening slots between the slots that are monitored.

If the wireless device 102 mistakenly reconfigures to use the second BWP configuration BWP ID-2 instead of the first configuration BWP ID-1 and the network base station continues to use the first configuration BWP ID-1 for communication with the wireless device 102, then the wireless device 102 can miss DL communication from the network base station sent on slots that the wireless device 102 is not monitoring while configured to use the second BWP configuration BWP ID-2. The BWP mismatch between the wireless device 102 and the network base station can interrupt data communication between the wireless device 102 and the network base station resulting in data stalls. Embodiments described herein regard detecting a BWP mismatch by the wireless device 102 and performing actions to mitigate the BWP mismatch.

As illustrated in diagram 340 of FIG. 3C, when a third BWP configuration, BWP ID-3, is active the wireless device 102 is required to monitor the CORESET search spaces of every applicable slot. The third BWP configuration BWP ID-2, however, can use a narrower bandwidth 342 that the first BWP configuration BWP ID-1, resulting in reduced power consumption for the wireless device 102, as transmission and reception via the analog hardware components of the wireless device 102 uses less bandwidth, which can reduce both transmit power requirements and receive power consumption due to reduced computational requirements. The CORESET search space for the third BWP configuration BWP ID-3 may be on the same time/frequency resources as for the first BWP configuration BWP ID-1 in some cases or may be on partially overlapping or non-overlapping time/frequency resources in some cases. In the latter cases of partial overlap or no overlap, the wireless device 102, if configured to use the third BWP configuration BWP ID-3 instead of the first BWP configuration BWP ID-1, can be unable to receive some or all DL PDCCH communication from the network base station resulting in a data stall and potentially causing the data connection between the wireless device 102 and the network base station to be restarted.

FIG. 4A illustrates a flow diagram 400 of an example of a BWP mismatch error occurrence between a wireless device 102 and a network base station, e.g., a 5G NR gNB 104. At 402, the wireless device 102 requests establishment of a radio resource control (RRC) connection with the 5G NR gNB 104. At 404, the 5G NR gNB 104 responds with a messages to establish the RRC connection with the wireless device 102. At 406, the wireless device 102 sends a messages to the 5G NR gNB 104 to indicate completion of the RRC establishment procedure. At 408, the 5G NR gNB 104 sends to the wireless device 102 an RRC reconfiguration message that can include indications of a set of BWP configurations for the wireless device 102. The example illustrated in FIG. 4A includes two BWP configurations for the wireless device 102, a first BWP configuration BWP ID-1 and a second BWP configuration BWP ID-2. Note that information regarding an initial BWP configuration, e.g., BWP ID-0, can be communicated in broadcast messages by the 5G NR gNB 104 previously and separately from the RRC reconfiguration message sent at 408. The RRC reconfiguration message sent at 408 can also indicate BWP ID-1 as the first active BWP configuration for the wireless device to use after the setup procedure has completed. At 412, and at 414, both the wireless device 102 and the 5G NR gNB 104 are configured to use the first BWP configuration, BWP ID-1, for communication. The wireless device 102 can monitor for PDCCH communication from the 5G NR gNB 104 during applicable slots on appropriate CORESET search spaces in accordance with the first BWP configuration, BWP ID-1. For example, as shown in FIG. 3A, the wireless device 102 can monitor on DL and special type slots of each frame.

At 416, the wireless device 102 decodes data received on a CORESET search space in accordance with BWP ID-1 to include a DCI message from the 5G NR gNB 104 that indicates the wireless device 102 should reconfigure to communicate in accordance with a second BWP configuration, BWP ID-2. The arrow between the 5G NR gNB 104 and the wireless device 102 is shown as a dashed line to indicate that the 5G NR gNB 104 has not actually sent a DCI message with such an indication, and the wireless device 102 has decoded data in error to indicate a BWP configuration switch. The communication protocol for changing BWP configurations via DCI messaging is based on a BWP ID value included in a DCI message for DL scheduled communication or for an UL grant, i.e., indicating the BWP configuration that the 5G NR gNB 104 will use for the scheduled DL communication or requires the wireless device 102 to use for sending UL communication. There is no confirming acknowledgement of the BWP switch, and therefore, the wireless device 102, switches from using the first BWP configuration, BWP ID-1, to using the second BWP configuration, BWP ID-2, after an appropriate BWP switching delay time period 426. As the 5G NR gNB 104 has not actually indicated to the wireless device 102 to change BWP configurations, the 5G NR gNB 104 continues to use the first BWP configuration, BWP ID-1, for communication with the wireless device 102, while the wireless device, at 418, is configured to use the second BWP configuration, BWP ID-2, resulting in a BWP mismatch between the wireless device 102 and the 5G NR gNB 104. The wireless device 102 can be unaware of the BWP mismatch, which can impact reception of DL communication from the 5G NR gNB 104. In the example of FIGS. 3A and 3B, the wireless device 102 monitors fewer DL/special slots while in the second BWP configuration, BWP ID-2, than while in the first BWP configuration. UL communication can remain unaffected as both BWP configurations, BWP ID-1 and BWP ID-2, use the same bandwidth. The wireless device 102 at 420 sends a scheduling request (SR) message to the 5G NR gNB 104 to obtain an UL grant for communicating pending data to the 5G NR gNB 104. The 5G NR gNB 104 responds with an UL grant, sent to the wireless device 102 at 422 in accordance with the first BWP configuration, BWP ID-1. The 5G NR gNB 104 does not want to change to the second BWP configuration, BWP ID-2, and therefore the UL grant includes a BWP indicator value for the first BWP configuration, BWP ID-1. The UL grant also includes an indication of time-frequency resources on which the wireless device 102 is granted to communicate UL data. occurs without a BWP switching delay. The 5G NR gNB 104 can be unaware of the BWP mismatch and expects the wireless device 102 is using the first BWP configuration, BWP ID-1. As there is no need for a BWP switching delay time period, the UL grant time-frequency resources can occur during a time period soon after receipt of the UL grant. The wireless device 102, at 424, decodes the UL grant received from the 5G NR gNB 104 to include an indication to switch to use BWP ID-1, as the wireless device 102 is operating using the second BWP configuration, BWP ID-2, and the UL grant includes a BWP indicator value for the first BWP configuration, BWP ID-1 The wireless device 102, at 424, can also interpret the UL grant as faulty when at least some of the granted UL time-frequency resources occur before a BWP switching time period would have elapsed. The wireless device 102, at 424, can discard the UL grant and remain using the BWP-2 configuration. In some cases, the wireless device 102 sends an SR message, and the 5G NR gNB 104 responds with an UL grant on a slot that is not monitored by the wireless device 102 because of the BWP mismatch, in which case the wireless device 102 does not receive the UL grant. In either case, the wireless device 102 does not use the UL grant provided by the 5G NR gNB 104, and pending UL data is stalled at the wireless device 102 due to the mismatch in BWP configurations used by the wireless device 102 and the 5G NR gNB 104.

Figure 4B:
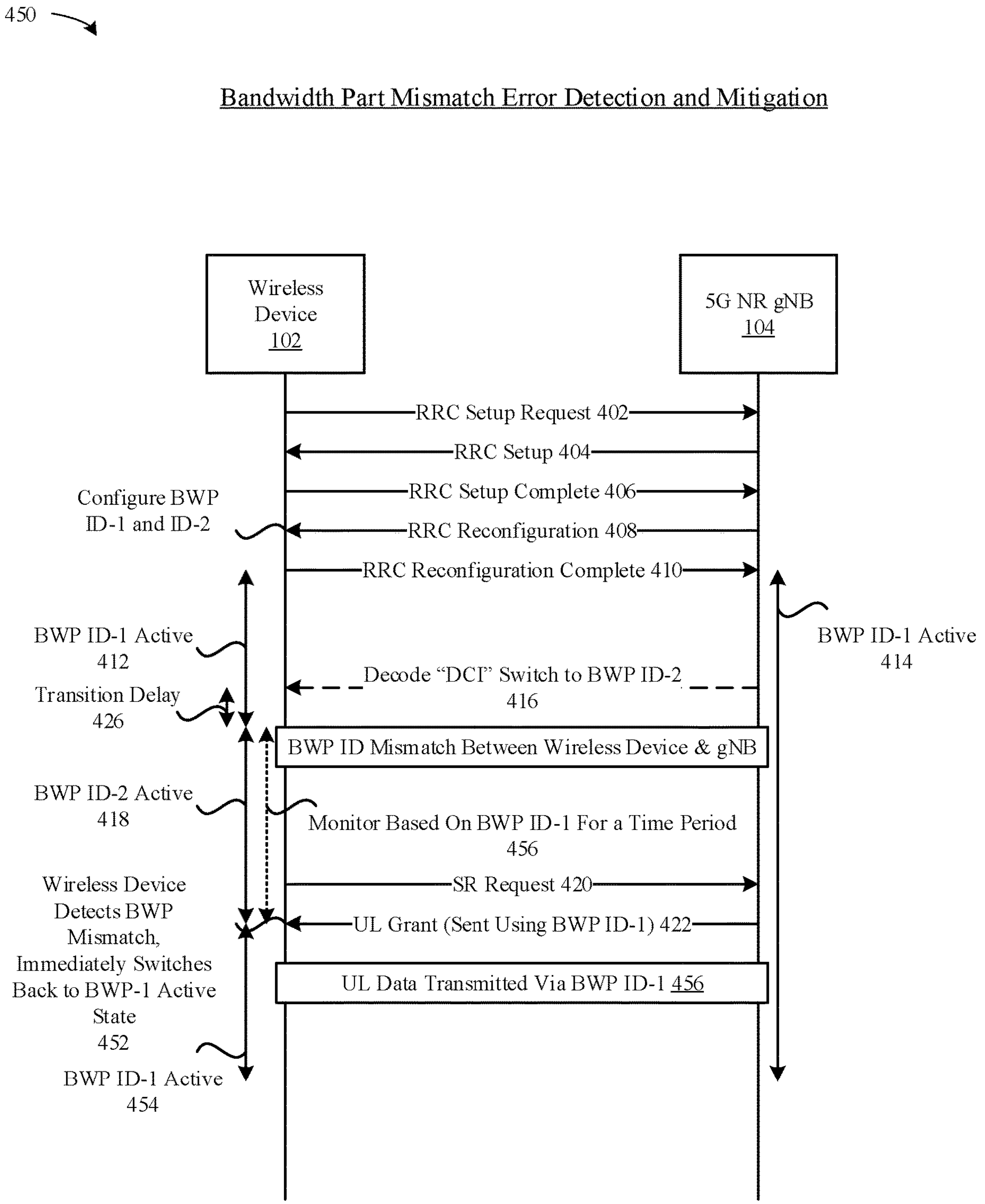
FIG. 4B illustrates a flow diagram of an example of detection and mitigation of a BWP mismatch occurrence between a wireless device and a 5G NR gNB base station, according to some embodiments.

FIG. 4B illustrates a flow diagram 450 of an example of detection and mitigation of a BWP mismatch occurrence between a wireless device 102 and a network base station, e.g., a 5G NR gNB 104. As in FIG. 4A, the wireless device 102 and the 5G NR gNB 104 establish an RRC connection, and the 5G NR 5gNB 104 configures the wireless device 102 with the set of BWP configurations, BWP ID-1 and BWP ID-2. While the wireless device 102 and the 5G NR gNB 104 are each configured to use the first BWP configuration BWP ID-1 for communication between them, the wireless device 102 errantly decodes data received on a CORESET search space to include a DCI message indicating to change to the second BWP configuration BWP ID-1, which results in a BWP mismatch between the wireless device 102 and the 5G NR gNB 104. To confirm or refute the indication to switch BWP configurations, the wireless device 102, at 456, can continue to monitor for PDCCH communication in accordance with the first BWP configuration BWP ID-1 while configured to use the second BWP configuration BWP ID-2 for a predetermined monitoring time period. For the specific exemplary first and second BWP configurations, BWP ID-1 and BWP ID-2 shown in FIGS. 3A and 3B, monitoring all applicable DL and special slots in each frame in accordance with the first BWP configuration BWP ID-1 rather than only every fourth slot (when applicable) in accordance with the second BWP configuration BWP ID-2 allows the wireless device 102 to receive DL communication from the 5G NR gNB 104 sent in accordance with the first BWP configuration BWP ID-1, e.g., on a slot that would otherwise not be monitored in accordance with the second BWP configuration BWP ID-2. The wireless device 102 can then receive, at 422, an UL grant communicated by the 5G NR gNB 104 in accordance with the first BWP configuration, BWP ID-1, responsive to an SR message, sent at 420, by the wireless device 102. As in FIG. 4A, the UL grant can include a BWP indicator value for the first BWP configuration, BWP ID-1, and can also include UL granted time-frequency resources that occur before a BWP switching delay time period would elapse. The wireless device 102, at 452, can detect a BWP mismatch based on this inconsistency, and instead of discarding the UL grant message as errant, the wireless device 102, at 454, can switch back to using the first BWP configuration, BWP ID-1, indicated in the UL grant received at 422, without waiting to complete a predetermined BWP switching delay time period for switching BWP configurations. In some embodiments, the transition from the second BWP configuration to the first BWP configuration occurs substantially immediately, e.g., as quickly as feasible, after detecting the BWP mismatch. The wireless device 102 does not wait for a normal BWP switching delay time period, and the wireless device 102 can communicate UL data to the 5G NR gNB 104 in accordance with the first BWP configuration, BWP ID-1.

Figure 5:
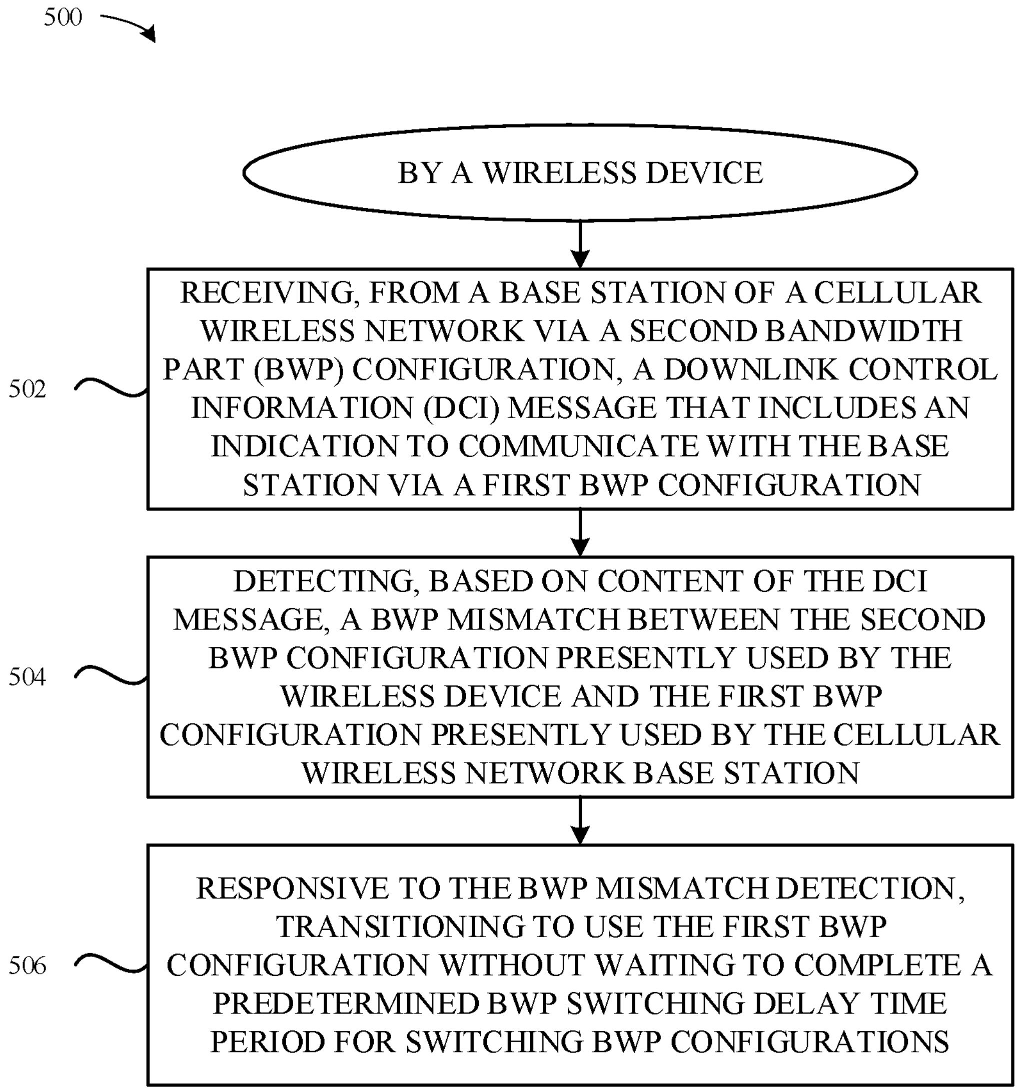
FIG. 5 illustrates a flow chart of an exemplary method for BWP mismatch detection and mitigation by a wireless device, according to some embodiments.

FIG. 5 illustrates a flowchart 500 of an exemplary method for BWP mismatch detection and mitigation by a wireless device 102 for a cellular wireless connection between the wireless device 102 and a cellular wireless network base station. At 502, the wireless device 102 receives, via a second BWP configuration, a DCI message that includes an indication to communicate with the cellular wireless network base station using a first BWP configuration. At 504, the wireless device 102 detects, based on content of the DCI message, a BWP mismatch between the second BWP configuration presently used by the wireless device 102 and the first BWP configuration presently used by the cellular wireless network base station. At 506, the wireless device 102, responsive to detecting the BWP mismatch, transitions from using the second BWP configuration to using the first BWP configuration without waiting to complete a predetermined BWP switching delay time period for switching BWP configurations. In some embodiments, the transition from the second BWP configuration to the first BWP configuration occurs substantially immediately, e.g., as quickly as feasible, after detecting the BWP mismatch.

In some embodiments, the wireless device 102 detects the BWP mismatch based on the content of the DCI message by determining the content of the DCI message includes, for the wireless device, a scheduled DL resource or a granted UL resource that is inconsistent with switching BWP configurations. In some embodiments, the scheduled DL resource or the granted UL resource occurs before completion of the predetermined BWP switching delay time period required for switching BWP configuration by the wireless device 102. In some embodiments, the method further includes the wireless device 102: i) decoding, while configured in accordance with the first BWP configuration, a second DCI message that includes a second indication for the wireless device 102 to communicate with the base station using the second BWP configuration; and ii) switching, after completion of the predetermined BWP switching delay time period after receipt of the second DCI message, from the first BWP configuration to the second BWP configuration. In some embodiments, the second DCI message includes a scheduled DL resource or a granted UL resource that occurs after completion of the predetermined BWP switching delay time period. In some embodiments, the method further includes the wireless device 102 monitoring, based on the first BWP configuration for a predetermined monitoring time period after switching to using the second BWP configuration, for DCI messages. In some embodiments, the first BWP configuration and the second BWP configuration use a same bandwidth region of a carrier, and the wireless device 102, while configured in accordance with the first BWP configuration, monitors for DCI messages more frequently than the while configured in accordance with the second BWP configuration. In some embodiments, while configured in accordance with the first BWP configuration or the second BWP configuration, the wireless device 102 monitors for DCI messages on all DL time slots, and the first BWP configuration uses a wider bandwidth region of a carrier than the second BWP configuration. In some embodiments, the method further includes the wireless device 102: i) receiving, from the base station during the predetermined monitoring time period while monitoring in accordance the first BWP configuration and configured to use the second BWP configuration, a third DCI message including a third indication for the wireless device 102 to communicate with the base station using the first BWP configuration; ii) determining the previously decoded second DCI message was errant; and iii) switching from using the second BWP configuration to using the first BWP configuration without waiting to complete the predetermined BWP switching delay time period for switching BWP configurations.

Figure 6:
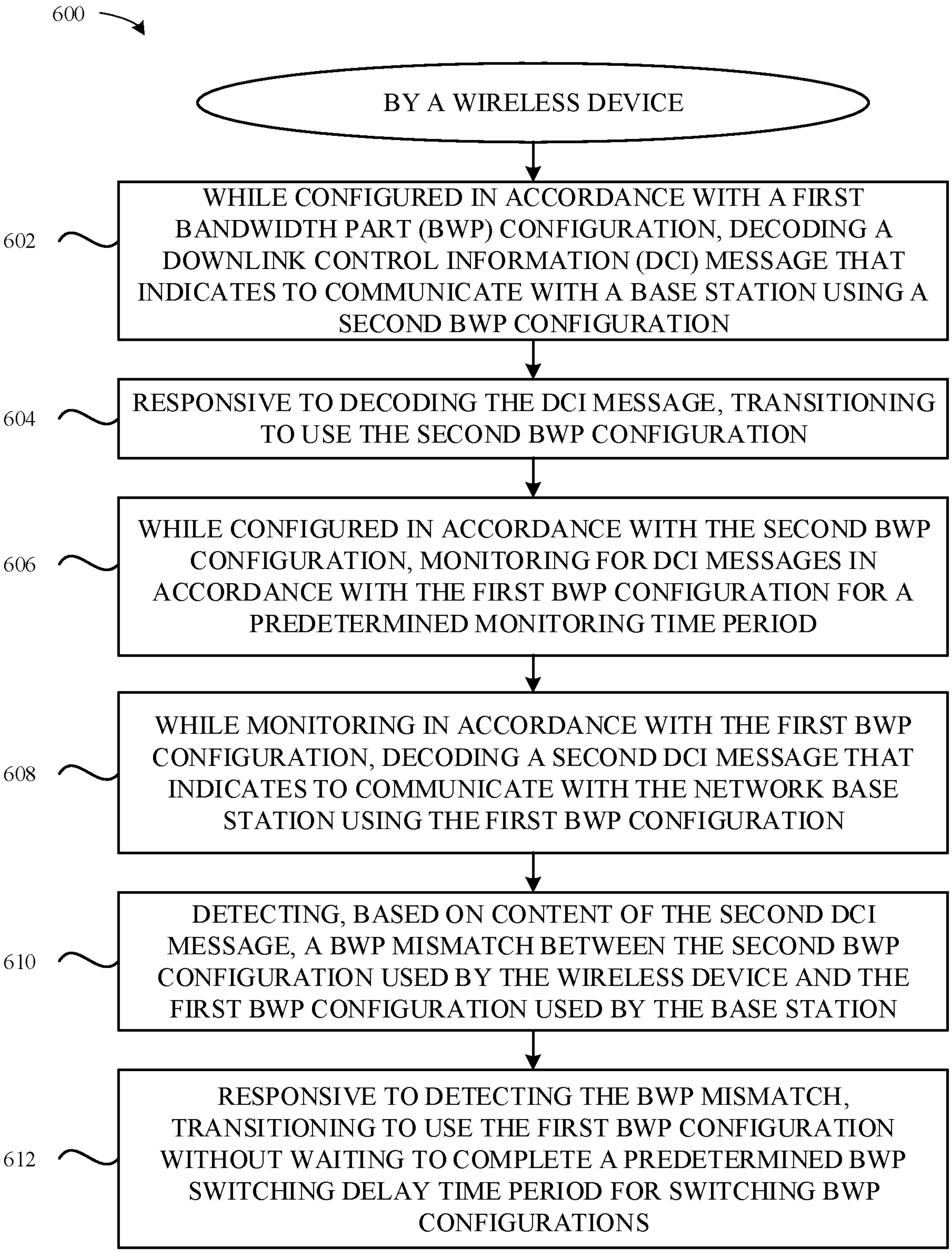
FIG. 6 illustrate a flow chart of another exemplary method for BWP mismatch detection and mitigation by a wireless device, according to some embodiments.

FIG. 6 illustrates a flowchart 600 of another exemplary method performed by a wireless device 102 to detect a BWP mismatch between the wireless device 102 and a base station of a cellular wireless network. At 602, the wireless device, while configured in accordance with a first BWP configuration, decodes a DCI message that indicates to communicate with the base station using a second BWP configuration. At 604, the wireless device 102, responsive to decoding the DCI message, transitions to use the second BWP configuration. At 606, the wireless device 102, while configured in accordance with the second BWP configuration, monitors for DCI messages in accordance with the first BWP configuration for a predetermined monitoring time period. At 608, the wireless device 102, while monitoring in accordance with the first BWP configuration, decodes a second DCI message that indicates to communicate with the network base station using the first BWP configuration. At 610, the wireless device detects, based on content of the second DCI message, a BWP mismatch between the second BWP configuration used by the wireless device 102 and the first BWP configuration used by the base station. At 612, the wireless device 102, responsive to detecting the BWP mismatch, transitions to use the first BWP configuration without waiting to complete a predetermined BWP switching delay time period for switching BWP configurations.

By monitoring for PDCCH communication, including DCI messages, for a predetermined monitoring time period after switching BWP configurations, the wireless device 102 can receive and decode DCI messages that may otherwise be missed, when an errant BWP switch has occurred, e.g., DCI messages sent in slots that would not be monitored or in CORESET search spaces that differ between different BWP configurations. The wireless device 102 can also receive a DCI message after switching BWP configurations during the predetermined monitoring time period that confirms the BWP configuration being used after switching BWP configurations, i.e., a second DCI message includes the same BWP ID value as a first DCI message that precipitated switching BWP configurations.

Representative Exemplary Apparatus

Figure 7:
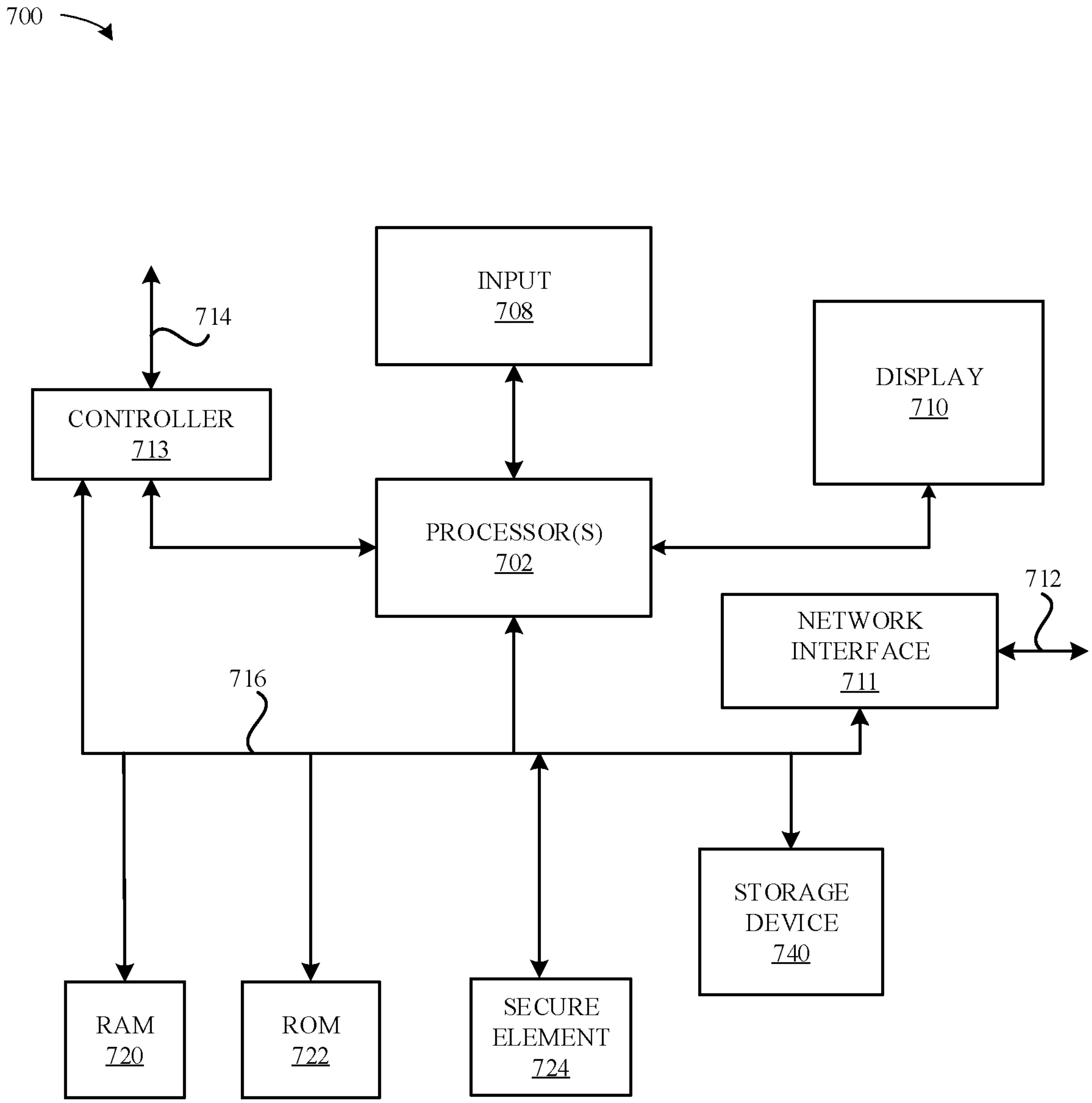
FIG. 7 illustrates a block diagram of exemplary elements of a wireless device, according to some embodiments.

FIG. 7 illustrates in block diagram format an exemplary computing device 700 that can be used to implement the various components and techniques described herein, according to some embodiments. In particular, the detailed view of the exemplary computing device 700 illustrates various components that can be included in the wireless device 102. As shown in FIG. 7, the computing device 700 can include one or more processors 702 that represent microprocessors or controllers for controlling the overall operation of computing device 700 and/or particular functions of the computing device 700, e.g., an applications processor, a baseband processor, a power control processor, etc. In some embodiments, the computing device 700 can also include a user input device 708 that allows a user of the computing device 700 to interact with the computing device 700. For example, in some embodiments, the user input device 708 can take a variety of forms, such as a button, keypad, dial, touch screen, audio input interface, visual/image capture input interface, input in the form of sensor data, etc. In some embodiments, the computing device 700 can include a display 710 (screen display) that can be controlled by the processor(s) 702 to display information to the user (for example, information relating to incoming, outgoing, or active communication sessions). A data bus 716 can facilitate data transfer between at least a storage device 740, the processor(s) 702, and a controller 713. The controller 713 can be used to interface with and control different equipment through an equipment control bus 714. The computing device 700 can also include a network/bus interface 711 that couples to a data link 712. In the case of a wireless connection, the network/bus interface 711 can include wireless circuitry, such as a wireless transceiver and/or baseband component. The computing device 700 can also include a secure element 724. The secure element 724 can include an eUICC and/or one or more UICCs.

The computing device 700 also includes a storage device 740, which can include a single storage or a plurality of storages (e.g., hard drives and/or solid-state drives), and includes a storage management module that manages one or more partitions within the storage device 740. In some embodiments, storage device 740 can include flash memory, semiconductor (solid state) memory or the like. The computing device 700 can also include a Random-Access Memory (RAM) 720 and a Read-Only Memory (ROM) 722. The ROM 722 can store programs, utilities or processes to be executed in a non-volatile manner. The RAM 720 can provide volatile data storage, and stores instructions related to the operation of the computing device 700.

Wireless Terminology

In accordance with various embodiments described herein, the terms "wireless communication device," "wireless device," "mobile device," "mobile station," "mobile wireless device," and "user equipment" (UE) may be used interchangeably herein to describe one or more consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near-field communication (NFC), a cellular wireless network, a fourth generation (4G) LTE, LTE Advanced (LTE-A), 5G, and/or 6G or other present or future developed advanced cellular wireless networks.

The wireless device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless devices that are also capable of communicating via different radio access technologies (RATs). In these scenarios, a multi-mode user equipment (UE) can be configured to prefer attachment to a 5G wireless network offering faster data rate throughput, as compared to other 4G LTE legacy networks offering lower data rate throughputs. For instance, in some implementations, a multi-mode UE may be configured to fall back to a 4G LTE network or a 3G legacy network, e.g., an Evolved High Speed Packet Access (HSPA+) network or a Code Division Multiple Access (CDMA) 2000 Evolution-Data Only (EV-DO) network, when 5G wireless networks are otherwise unavailable.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for bandwidth part (BWP) mismatch detection for a cellular wireless connection between a wireless device and a base station of a cellular wireless network, the method comprising:

by the wireless device:

receiving, from the base station via a second BWP configuration, a downlink control information (DCI) message that includes an indication for the wireless device to communicate with the base station via a first BWP configuration;

detecting, based on content of the DCI message, a BWP mismatch between the second BWP configuration presently used by the wireless device and the first BWP configuration presently used by the base station; and responsive to the BWP mismatch detection, transitioning to use the first BWP configuration without waiting to complete a predetermined BWP switching delay time period for switching BWP configurations.

2. The method of claim 1, wherein detecting the BWP mismatch based on the content of the DCI message comprises:

by the wireless device:

determining the content of the DCI message includes, for the wireless device, a scheduled downlink (DL) resource or a granted uplink (UL) resource that is inconsistent with switching BWP configurations.

3. The method of claim 2, wherein the scheduled DL resource or the granted UL resource occurs before completion of the predetermined BWP switching delay time period for switching BWP configurations.

4. The method of claim 1, further comprising:

by the wireless device:

decoding, while configured in accordance with the first BWP configuration, a second DCI message that includes a second indication for the wireless device to communicate with the base station using the second BWP configuration; and switching, after completion of the predetermined BWP switching delay time period after receipt of the second DCI message, from the first BWP configuration to the second BWP configuration.

5. The method of claim 4, wherein the second DCI message includes a scheduled DL resource or a granted UL resource that occurs after completion of the predetermined BWP switching delay time period.

6. The method of claim 4, further comprising:

by the wireless device:

monitoring, based on the first BWP configuration for a predetermined monitoring time period after switching to the second BWP configuration, for DCI messages.

7. The method of claim 6, wherein:

the first BWP configuration and the second BWP configuration use a same bandwidth region of a carrier; and the first BWP configuration monitors for DCI messages more frequently than the second BWP configuration.

8. The method of claim 6, wherein:

the first BWP configuration and the second BWP configuration each monitor for DCI messages on all DL time slots; and the first BWP configuration uses a wider bandwidth region of a carrier than the second BWP configuration.

9. The method of claim 6, further comprising:

by the wireless device:

receiving, from the base station during the predetermined monitoring time period while configured to use the second BWP configuration and monitoring based on the first BWP configuration, a third DCI message including a third indication for the wireless device to communicate with the base station using the first BWP configuration;

determining the previously decoded second DCI message was errant; and switching from using the second BWP configuration to using the first BWP configuration without waiting to complete the predetermined BWP switching delay time period for switching BWP configurations.

10. A wireless device configured for bandwidth part (BWP) mismatch detection for a cellular wireless connection between the wireless device and a base station of a cellular wireless network, the wireless device comprising:

one or more antennas; and a baseband processor communicatively coupled to the one or more antennas and a memory storing instructions that when executed configure the wireless device to:

receive, from the base station via a second BWP configuration, a downlink control information (DCI) message that includes an indication for the wireless device to communicate with the base station using a first BWP configuration;

detect, based on content of the DCI message, a BWP mismatch between the second BWP configuration presently used by the wireless device and the first BWP configuration presently used by the base station; and responsive to detecting the BWP mismatch, transition to use the first BWP configuration without waiting to complete a predetermined BWP switching delay time period for switching BWP configurations.

11. The wireless device of claim 10, wherein the wireless device is configured to detect the BWP mismatch based on the content of the DCI message by:

determining the content of the DCI message includes, for the wireless device, a scheduled downlink (DL) resource or a granted uplink (UL) resource that is inconsistent with switching BWP configurations.

12. The wireless device of claim 11, wherein the scheduled DL resource or the granted UL resource occurs before completion of a predetermined BWP switching delay time period required for switching BWP configurations by the wireless device.

13. The wireless device of claim 10, wherein the wireless device is further configured to:

decode, while configured to use the first BWP configuration, a second DCI message that includes a second indication for the wireless to communicate with the base station using the second BWP configuration; and switch, after completion of the predetermined BWP switching delay time period after receipt of the second DCI message, from using the first BWP configuration to using the second BWP configuration.

14. The wireless device of claim 13, wherein the second DCI message includes a scheduled DL resource or a granted UL resource that occurs after completion of the predetermined BWP switching delay time period.

15. The wireless device of claim 13, wherein the wireless device is further configured to:

monitor, based on the first BWP configuration for a predetermined monitoring time period after switching to using the second BWP configuration, for DCI messages.

16. The wireless device of claim 15, wherein:

the first BWP configuration and the second BWP configuration use a same bandwidth region of a carrier; and the first BWP configuration monitors for DCI messages more frequently than the second BWP configuration.

17. The wireless device of claim 15, wherein:

the first BWP configuration and the second BWP configuration each monitor for DCI messages on all DL time slots; and the first BWP configuration uses a wider bandwidth region than the second BWP configuration.

18. The wireless device of claim 15, wherein the wireless device is further configured to:

receive, from the base station during the predetermined monitoring time period while configured to use the second BWP configuration and monitoring based on the first BWP configuration, a third DCI message including a third indication for the wireless device to communicate with the base station using the first BWP configuration;

determine the previously decoded second DCI message was errant; and switch from using the second BWP configuration to using the first BWP configuration without waiting to complete the predetermined BWP switching delay time period for switching BWP configurations.

19. A non-transitory computer-readable medium storing instructions for bandwidth part (BWP) mismatch detection for a cellular wireless connection between a wireless device and a base station of a cellular wireless network, the instructions comprising:

instructions for decoding, while configured to use a first BWP configuration, a downlink control information (DCI) message that indicates to communicate with the base station using a second BWP configuration;

instructions for responsive to decoding the DCI message, transitioning to use the second BWP configuration;

instructions for monitoring, while configured to use the second BWP configuration, for DCI messages in accordance with the first BWP configuration for a predetermined monitoring time period; and instructions for transitioning back to the first BWP configuration, without waiting to complete a predetermined BWP switching delay time period for switching BWP configurations, responsive to detecting a BWP mismatch between the wireless device and the base station.

20. The non-transitory computer-readable medium of claim 19, the instructions further comprising:

instructions for decoding, while monitoring in accordance with the first BWP configuration, a second DCI message that indicates to communicate with the base station using the first BWP configuration; and instructions for detecting, based on content of the second DCI message, the BWP mismatch between the second BWP configuration used by the wireless device and the first BWP configuration used by the base station.

* * * * *